United States Patent Office 3,838,194
Patented Sept. 24, 1974

3,838,194
PROCESS FOR MAKING HEXAGONAL MACROCRYSTALS OF ALUMINUM HYDRIDE
Paul F. Reigler, Midland, and Lz F. Lamoria, Bay City, Mich., assignors to The Dow Chemical Company, Midland, Mich.
No Drawing. Filed Mar. 22, 1967, Ser. No. 627,247
Int. Cl. C01b 6/00
U.S. Cl. 423—645                                    3 Claims

ABSTRACT OF THE DISCLOSURE

An improvement in a process for preparing large crystals of substantially non-ether solvated, crystalline aluminum hydride by heating an aluminum hydride source material in an ether containing solution. The present improvement comprises employing a slurry of aluminum hydride n-propyl etherate as the aluminum source material thereby providing the unexpected advantages of not having to distill ether from the reaction mass or to maintain an elevated pressure on the system as required in the process as practiced heretofore.

BACKGROUND OF THE INVENTION

Macrocrystalline, i.e. particles larger than 10 microns, substantially non-solvated, crystalline aluminum hydride heretofore has been prepared as taught in patent application Ser. No. 234,275, filed Oct. 23, 1962 by Donald L. Schmidt and Ronald W. Diesen. This process generally comprises providing an ether solution, e.g. diethyl ether, of aluminum hydride and maintaining this solution at a temperature of from about 50 to about 85° C. for a period of time thereby to precipitate crystalline, substantially non-solvated aluminum hydride directly in the reaction mass. Ordinarily the reaction is carried out in the presence of a complex metal hydride which is soluble in the solution. Preferably the temperature is maintained from about 60 to about 80° C. and desirably at from about 76–76.5° C.

The ether solution of aluminum hydride employed as a starting material in this process can be a reaction product mixture resulting from the well-known reaction of $AlCl_3$ and $LiAlH_4$ in diethyl ether, or the ether solution of aluminum hydride produced by other processes. Usually the solution has an $AlH_3$/ether ratio of from about 0.05 to about 1.

With low boiling ether solvents the required reaction temperatures are obtained by controllably increasing the pressure on the solution while heating thereby to raise the effective boiling point of the solution and give a predetermined reaction temperature. Alternatively a mixture of an inert solvent having a boiling point of at least 50° C. can be admixed with the ethereal solution to provide a solution having the requisite operating temperature. This solvent should be inert to the aluminum hydride product; i.e. should not detrimentally react with the reaction mixture so as to destroy or change the product and preferably should have a boiling point of at least about 80° C. Liquid hydrocarbons such as benzene, toluene, biphenyl, xylene, biphenyl benzene, decane and the like are suitable for use in the process. The amount of solvent to be used is not critical except that it must be sufficient to produce the desired boiling point rise in the reaction solution.

Alternatively in the process, a combination of increased pressure on the reaction mass and inert solvent addition to the ether solution can be employed if desired to achieve the requisite predetermined elevated temperature of operation.

Within this general operating procedure, by concentrating the solution through removal of solvent during the elevated temperature treatment, predominantly there is produced large crystals of a substantially solvent-free hexagonal aluminum hydride identified and characterized in a copending application Ser. No. 179,509 of Norman E. Matzek and Donald F. Musinski, filed Mar. 8, 1962.

These crystals are particularly suitable for use in solid propellants as they offer ease of handling and storage from the standpoint of formulation and safety. They also exhibit excellent compatibility and blendability with other ingredients used in solid propellant formulations.

In the preferred practice of the process, crystallization of the large particle size, non-solvated aluminum hydride is promoted when a complex metal hydride, e.g. $LiAlH_4$, $NaAlH_4$, $LiBH_4$, $NaBH_4$, mixtures of these and the like, is incorporated into and dissolved in the reaction mass to provide a complex metal hydride/$AlH_3$ gram mole ratio of from about 0.025 to about 1, and preferably from about 0.25 to 0.5 based on the $AlH_3$ product in the solution. Preferably a mixture containing about equal parts of lithium aluminum hydride and lithium borohydride is employed. For those solutions where the $AlH_3$ is recovered directly from a reaction product mixture, for example by interacting $AlCl_3$ and $LiAlH_4$, the amount of complex metal hydride to be employed is calculated to be that in excess of the quantity required for actual preparation of the $AlH_3$ product.

This process is satisfactory for preparing the substantially non-solvated, macrocrystalline, hexagonal aluminum hydride but does have certain problems associated therewith. Since a dilute diethyl ether solution of aluminum hydride is added to a benzene-diethyl ether reaction mixture containing complex metal hydride (usually a mixture of lithium aluminum hydride and lithium borohydride), control of the desired crystallization temperature, i.e. at about 76–78° C. must be maintained by removal of excess diethyl ether through distillation. For optimum product yield, this process requires a continual make-up of fresh, dilute aluminum hydride diethyl ether solution and the expensive, cumbersome distillation operational step. It is well understood by one skilled in the art that the distillation of ethers in large scale operations is somewhat hazardous as well as being troublesome and requiring complex processing equipment and distillation assemblies.

It is a principal object of the present invention to provide a novel improved process for preparing macrocrystalline, substantially non-ether solvated aluminum hydride products.

It is another object of the present invention to provide an improvement in the process for preparing such particulate aluminum hydride which does not require distillation of ether solvent.

It is also an object of the present invention to provide an improved process for preparing hexagonal, crystalline, substantially non-ether solvated aluminum hydride utilizing a stable aluminum hydride source material reactant which can be stored indefinitely prior to use in the process.

These and other objects and advantages will become apparent from the detailed description presented hereinafter.

SUMMARY

The present process comprises an improvement to the process discussed hereinbefore for preparing macrocrystalline, substantially non-solvated aluminum hydride, the novel improvement comprising adding the n-propyl etherate of aluminum hydride slurried in a diethyl ether-inert organic solvent mixture to a second mixture of diethyl ether-inert organic solvent, usually containing complex alkali metal hydride, wherein the diethyl ether-inert organic solvent concentrations in both mixtures is substantially the same.

DESCRIPTION OF THE PREFERRED EMBODIMENT

In a preferred embodiment of the present invention, a mixture of about equal molar quantities of lithium aluminum hydride and lithium borohydride dissolved in a diethyl ether-benzene solution containing from about 3.8 to about 6.5 percent, and preferably about 5 volume percent, diethyl ether, balance benzene is heated to reflux, this temperature ranging from about 76 to about 78° C. depending on the quantity of ether in the solvent mixture. With solutions containing less than about 3.8 percent by volume diethyl ether the solubility of the complex metal hydride and aluminum hydride source material are too low for good crystal growth and with more than about 6.5 volume percent diethyl ether, extraneous crystal phases can occur.

Aluminum hydride n-dipropyl etherate

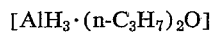

$$[AlH_3 \cdot (n-C_3H_7)_2O]$$

slurried in a second portion of diethyl ether-benzene solution of the same composition as used to dissolve the complex metal hydrides is added slowly to the complex hydride containing ether-benzene solution and the resulting reaction mixture maintained at between about 76–78° C. for about an hour or more after the reactant addition is complete. The quantity of slurry is controlled such that the amount of complex metal hydride/aluminum hydride product is maintained at a gram mole ratio of from about 0.025 to about 1. During the reaction period, macrocrystalline, hexagonal substantially non-solvated aluminum hydride of the same crystal form as that described in patent application Ser. No. 179,509 crystallizes directly in the reaction mass. These crystals readily are recovered by decantation, filtration, centrifugation or other solids-liquids separatory techniques.

The crystalline product usually is washed, e.g. with diethyl ether, and dried under an inert atmosphere.

The present improvement provides the unexpected advantage of not having to (1) carefully distill ether in a controlled manner or (2) maintain the reaction mass under an elevated pressure in order to hold the operating temperature within the requisite range. Rather, because of the unique slurry form of aluminum hydride source material employed, the reaction temperature readily is maintained without pressurizing the system and the need for controllably distilling ether from the reaction mass is eliminated.

The concentration of the aluminum hydride·n-propyl ether in the diethyl ether-benzene carrier can be varied to provide a slurry ranging from thick paste-like consistency to a very thin, dilute fluid mass. Generally, a slurry is prepared such that it is readily handled by conventional material handling and transporting means, i.e. pumps, but is not so dilute as to require unduly large storage vessels and material handling equipment. Ordinarily a slurry having an aluminum hydride·n-propyl etherate solids content ranging from about 0.5 to about 5 weight percent is employed. With such concentrations, the solids readily are kept suspended in the slurry prior to reaction and these readily can be handled and transported.

The rate of addition of the slurry to the complex metal hydride solution is not critical. However, ordinarily the slurry is not heated prior to its addition to the solution; therefore, this material should be added at a controlled rate such that the requisite, predetermined reaction temperature is maintained. Slow continuous or intermittent batch-type additions can be employed. In actual practice it has been found that a total reaction time, including addition of the slurry, of from less than one hour to six hours or more is satisfactory. Optimum desolvation and product yield is obtained at a total reaction time of about 2 hours.

The actual relative quantities of the complex hydride containing solution and the slurry can be varied over a wide range and are not critical. In actual practice, the volumes usually are selected so as to provide readily handled volumes of process materials.

All processing, including initial reactant preparation, usually is carried out under a substantially anhydrous, inert atmosphere to assure optimum in product yield and purity.

The aluminum hydride n-propyl etherate readily is prepared by reacting lithium aluminum hydride and an aluminum chloride diethyl etherate in n-propyl ether. The reaction mixture is filtered immediately after the addition of the aluminum chloride to a propyl ether solution of lithium aluminum hydride is completed in order to remove by-product solids, e.g. LiCl. The desired aluminum hydride·n-propyl ether in high purity precipitates as a solid in the filtrate upon standing and readily is recovered therefrom.

This compound is a white, solid crystalline material which is quite stable at room temperature for extended periods of time when stored under a substantially anhydrous inert atmosphere.

Although a benzene-diethyl ether solvent system is employed in the preferred embodiment of the present invention since this readily can be prepared to give the preferred temperature (~76–78° C.) to prepare the highly useful macrocrystalline hexagonal product described hereinbefore, it is to be understood that the improved process of the present invention can be used with the other solvent systems and reaction temperatures and reactant ratios disclosed herein to provide other crystalline forms of non-solvated aluminum hydride.

The following Example will serve to further illustrate the present invention but is not meant to limit it thereto.

EXAMPLE (a) Preparation of aluminum hydride n-propyl etherate

About 2.68 grams (70.7 millimoles) of lithium aluminum hydride was added at about room temperature to 100 milliliters of n-propyl ether $(C_3H_7)_2O$, and the resulting mixture stirred for about two hours. Solid aluminum chloride diethyl etherate, $AlCl_3 \cdot (C_2H_5)_2O$ (4.15 grams, i.e. 20 millimoles $AlCl_3$) was added to the agitated lithium aluminum hydride solution. After the aluminum chloride addition was complete, the resulting mixture was rapidly filtered through a medium porosity glass frit to separate solid by-products, primarily lithium chloride, from the product solution.

The product solution was allowed to stand at room temperature and after about five minutes a white precipitate started to form therein. This product mass was maintained at this temperature for about one hour to assure that precipitation of the aluminum hydride n-propyl etherate product was substantially complete. Following this period, the solid product was collected by filtration through a medium porosity sintered glass frit. The white, crystalline particles were dried under a low pressure at room temperature.

Elemental analysis gave H—11.14%; C—30.30%; Al—49.36%; Li—0.19%; Cl—<0.1%. This corresponds to an aluminum hydride n-propyl etherate corresponding to the approximate empirical formula $AlH_3 \cdot 0.24(C_3H_7)_2O$.

An X-ray diffraction analysis indicated this material to be similar to a diethyl etherate of aluminum hydride except the longest spacing is at 12.5 A. instead of at 12.0 A.

A sample of this n-propyl etherate was stored for about three months at room temperature under a substantially anhydrous atmosphere. Elemental analysis of this sample after storage gave H—11.18%; C—29.86%; Al—48.67% indicating the product possessed a high degree of stability and a good resistance to auto-decomposition.

(b) Preparation of hexagonal macrocrystalline, substantially non-solvated $AlH_3$ Abou 1.8 grams (equivalent to 60 millimoles $AlH_3$) of the aluminum hydride n-propyl etherate prepared as described directly hereinbefore was slurried into a mixture of 80 milliliters of substantially anhydrous benzene and 4 milliliters diethyl ether (~95 volume percent benzene-5 volume percent diethyl ether). The resulting slurry was placed in an addition funnel fitted with internal mechanical stirring apparatus. The funnel was attached to a flask containing about 2000 milliliters of a 95 volume percent benzene-5 volume percent diethyl ether solution having about 5 millimoles $LiAlH_4$ and 5 millimoles of $LiBH_4$ dissolved therein.

The solution in the flask was heated to a temperature of 77–78° C. and maintained at this temperature while the aluminum hydride n-propyl etherate slurry slowly was added at a rate to assure that the temperature did not fall below the indicated minimum. This addition took about an hour. Following completion of the slurry addition, the reaction mass was heated at 77–78° C. for an additional hour during which time white crystals precipitated in the reaction mass. Substantially no pressure in excess of atmospheric was noted over the entire reaction period and no ether was distilled from the reaction mass.

The solid crystalline product was separated from the residual liquid and the collected solids were washed three times with diethyl ether and dried under nitrogen.

Analysis of the product material by X-ray diffraction showed this to be substantially all hexagonal, crystalline aluminum hydride particles corresponding to the non-solvated compound characterized and described in patent application Ser. No. 179,509.

The crystals were found to range from about 10 to about 50 microns in size with some larger particles being present.

Various modifications can be made in the present invention without departing from the spirit or scope thereof for it is understood that we limit ourselves only as defined in the appended claims.

We claim:

1. In a process for preparing substantially non-solvated, hexagonal crystals of aluminum hydride ranging from about 10 to about 50 microns in size by heating an etherated aluminum hydride in a solution of diethyl ether and an organic liquid inert to the aluminum hydride product, said solution having an alkali metal complex hydride dissolved therein, said solution also having a boiling point of from about 50° C. to about 80° C. and the gram mole ratio of complex metal hydride/aluminum hydride product being from about 0.025 to about 1 the improvement which comprises: employing a slurry of aluminum hydride n-propyl etherate in a carrier liquid as the aluminum hydride source material, said carrier liquid being of the same composition as the diethyl ether-inert organic liquid, and introducing said slurry into the alkali metal complex hydride containing solution at a rate such that the temperature is maintained within said temperature range.

2. The process as defined in Claim 1 wherein the diethyl ether-inert organic liquid solvent for said alkali metal complex hydride and the diethyl ether-inert organic liquid carrier for said aluminum hydride n-propyl etherate both are a diethyl ether-benzene solution of the same composition, said solutions each having from about 3.8 to about 6.5 percent by volume diethyl ether, balance benzene and characterized as having a boiling point of from about 76 to about 78° C.

3. The proces as defined in Claim 2 wherein the diethyl ether-benzene solutions each contain about 5 percent by volume diethyl ether.

References Cited
FOREIGN PATENTS 840,572   7/1960   Great Britain.

OTHER REFERENCES

Rice et al.: Nonsolvated Aluminum Hydride, Astia Ad #106967, Aug. 1, 1956.

CARL D. QUARFORTH, Primary Examiner

R. L. TATE, Assistant Examiner